(12) United States Patent
Vorhies et al.

(10) Patent No.: US 8,011,098 B2
(45) Date of Patent: Sep. 6, 2011

(54) WIND TURBINE ERECTOR

(76) Inventors: Roger W. Vorhies, Keosauqua, IA (US);
Jerard B. Hoage, Fairfield, IA (US)

( * ) Notice: Subject to any disclaimer, the term of this patent is extended or adjusted under 35 U.S.C. 154(b) by 125 days.

(21) Appl. No.: 12/194,093

(22) Filed: Aug. 19, 2008

(65) Prior Publication Data
US 2010/0044330 A1     Feb. 25, 2010

(51) Int. Cl.
*F03D 11/04*     (2006.01)
(52) U.S. Cl. ............... 29/889.2; 29/889.21; 212/176; 212/270
(58) Field of Classification Search ............ 29/889.2, 29/889.21; 212/176, 270
See application file for complete search history.

(56) References Cited

U.S. PATENT DOCUMENTS

| | | | | |
|---|---|---|---|---|
| 4,028,792 | A * | 6/1977 | Tax et al. | 29/431 |
| 5,244,346 | A | 9/1993 | Fergusson | |
| 5,417,018 | A * | 5/1995 | Matsumoto et al. | 52/123.1 |
| 5,490,364 | A | 2/1996 | Desai et al. | |
| 5,794,387 | A | 8/1998 | Crookham | |
| 6,408,575 | B1 | 6/2002 | Yoshida et al. | |
| 6,522,025 | B2 | 2/2003 | Willis et al. | |
| 6,782,667 | B2 | 8/2004 | Henderson | |
| 6,868,646 | B1 | 3/2005 | Perina | |
| 7,218,013 | B2 | 5/2007 | Platt | |
| 7,231,741 | B2 | 6/2007 | Norwood | |
| 2005/0005562 | A1 | 1/2005 | Henderson et al. | |
| 2009/0087311 | A1* | 4/2009 | Wyborn | 416/9 |

FOREIGN PATENT DOCUMENTS

| | | | |
|---|---|---|---|
| JP | 64-1994 | * | 1/1989 |
| JP | 4-308196 A | * | 10/1992 |
| JP | 2001-254668 A1 | * | 9/2001 |
| JP | 2002-242483 A | * | 8/2002 |
| JP | 2005-42313 A | * | 2/2005 |
| JP | 2005-201128 A | * | 7/2005 |
| JP | 3827321 A | * | 7/2006 |
| WO | 2004/088133 A | * | 3/2004 |

OTHER PUBLICATIONS

STIC translation of JP 2001-254668.*
STIC translation of JP 2002-242483.*
STIC translation of JP 2005-201128.*

* cited by examiner

*Primary Examiner* — Thomas J. Brahan
(74) *Attorney, Agent, or Firm* — McKee, Voorhees & Sease, P.L.C.

(57) ABSTRACT

A wind tower erection device and method for erecting wind turbine towers which avoid the need for using expensive cranes. The device and method employs a stacker unit for anchoring to the wind turbine foundation, a plurality of intermediate modules, and a mechanical actuator for raising the intermediate modules vertically. The stacker unit has a receptacle allowing for lateral sliding of intermediate modules inside of the stacker unit. In one embodiment, the stacker unit has a receptacle for lateral sliding of intermediate modules inside of the stacker unit. The stacker unit and the intermediate modules each have at least one open side to for positioning of tower sections within the stacker unit and stacked intermediate modules. A bridge crane section is initially placed on top of the stacked intermediate modules. The bridge crane is raised vertically as additional intermediate modules are added at the bottom, thereby allowing wind tower sections to be winched into place using the crane, each being added on top of the other as the stacked intermediate modules increase to the necessary height.

25 Claims, 12 Drawing Sheets

WIND TURBINE ERECTOR

BACKGROUND OF THE INVENTION

This invention relates to a method and system for erecting wind energy turbines that allow one to avoid the use of specialized and expensive cranes.

Wind turbines are becoming ever more popular as the expense of electrical energy continues to increase. A typical wind turbine uses a rotary driven generator mounted atop a tower which can reach 80 meters or more in height. The next generation of towers will reach a height of 120 meters at the hub. In fact, 1.5 MW-2.5 W generators at 80 meters high are the staple of this industry because of what the highway systems can operate. The current method to erect towers with 80 meter hub height is with 3 cranes. A 50 ton crane is used for the blades and the hub to suspend them for pre-assembly prior to the use of a 450 ton crane to take the assembly to the 80 meter level. Prior to raising the assembly a 250 ton crane will set the first two tower sections. The first tower section is 90' long with a 14' diameter at the base and weighs approximately 90,000 pounds. The next section is 75' and 75,000 pounds and the section diameter decreases to around 12'. The third tower section and final 75' section weighs less than 75,000 pounds and tapers to 8' in diameter. This piece is lifted by the 450 ton crane while the erectors are inside the towers on spiral stairs making connections using the interior flange bolt method, as does all the components above the base. It therefore takes 2 cranes to set the towers upright prior to erection.

Typically the three above-referred to tower sections come to the building site on large trucks, as does the wind turbine housing, hub, and the blades, which themselves are normally 145' long. The large cranes used in the typical tower erection often are very expensive, renting for $88,000/week or $240,000/month plus maintenance. Furthermore, 38 trucks are required to mobilize the cranes and cost $100,000 to bring into the site as well as out. Thus, time is of the essence and a way to avoid the use of, for example, a 450 ton crane would be hugely desirable and save money.

There have been attempts in the past to eliminate large high tonnage lifting cranes for erecting wind turbines. Those for the most part have been unsuccessful since they themselves are highly specialized and expensive equipment. Such an example is U.S. Pat. No. 6,868,646 which uses a climber device. One problem with such devices is that strength of the structure is not increased as the device climbs the erected tower sections and the first tower section must still be set with a heavy duty crane. Another problem is the expense and slowness of operation. With the enormous forces exerted on the tower that is being climbed in U.S. Pat. No. 6,868,646, it is likely that one would still need a large crane or another device to set the generator and the hub.

Accordingly there is a continuing need for the development of wind energy turbine erection devices which are cheap in construction, which increases in load bearing strength when the wind turbine is being erected, and which avoids the use of highly expensive large tonnage cranes on the job site.

This invention has as its primary objective the fulfillment of this continuing need by developing a new erection system and method which is quick, inexpensive, superior in economics and construction strength (load bearing capacity during erection).

A further object of the present invention is to provide an improved method of attaching a hub with rotor blades to the housing atop the wind turbine tower sections.

These and other objects will be apparent to those skilled in the art.

BRIEF SUMMARY OF THE INVENTION

A wind turbine erection device and methods for erecting wind turbines which avoids the need for using expensive cranes. The device and method employs a stacker unit for anchoring to the wind turbine foundation, a plurality of intermediate modules, and a mechanical actuator for raising the intermediate modules vertically. The stacker unit has a receptacle allowing for lateral sliding of intermediate modules inside of the stacker unit. In one embodiment, the stacker unit and intermediate modules also have at least one open side to allow for positioning of base, intermediate, and top tower sections within the stacker unit and stacked intermediate modules. A bridge crane section is initially placed on top of a plurality of stacked intermediate modules and is raised vertically as additional intermediate modules are added at the bottom. The stacking of intermediate modules allows the base, intermediate, and top tower sections to be winched into place using the crane, each being added on top of the other as the stacked intermediate modules increase to the necessary height.

BRIEF DESCRIPTION OF THE DRAWINGS

FIG. 5B shows a side view of the fully erect base, intermediate, top tower sections, and housing. FIG. 5B also shows how the hub and rotors are placed within the stacked intermediate modules before they are attached to the housing.

DETAILED DESCRIPTION OF THE PREFERRED EMBODIMENT

For a better understanding of the present invention, specific exemplary embodiments according to present invention will be described in detail. The exemplary embodiments of the present invention have been set forth within the drawings and in the foregoing description and although specific terms are employed, these are used in the generically descriptive sense only and not used for the purposes of limitation. Changes in the form and proportion of parts as well as in substitution of equivalents are contemplated as circumstances may suggest or are rendered expedient without departing from the spirit and scope of the invention as further defined in the following description and claims.

Reference numerals will be used to indicate certain parts and locations throughout the Figures. The same reference numerals will be used to indicate the same or similar parts and locations throughout the Figures unless otherwise indicated.

Figure 1:
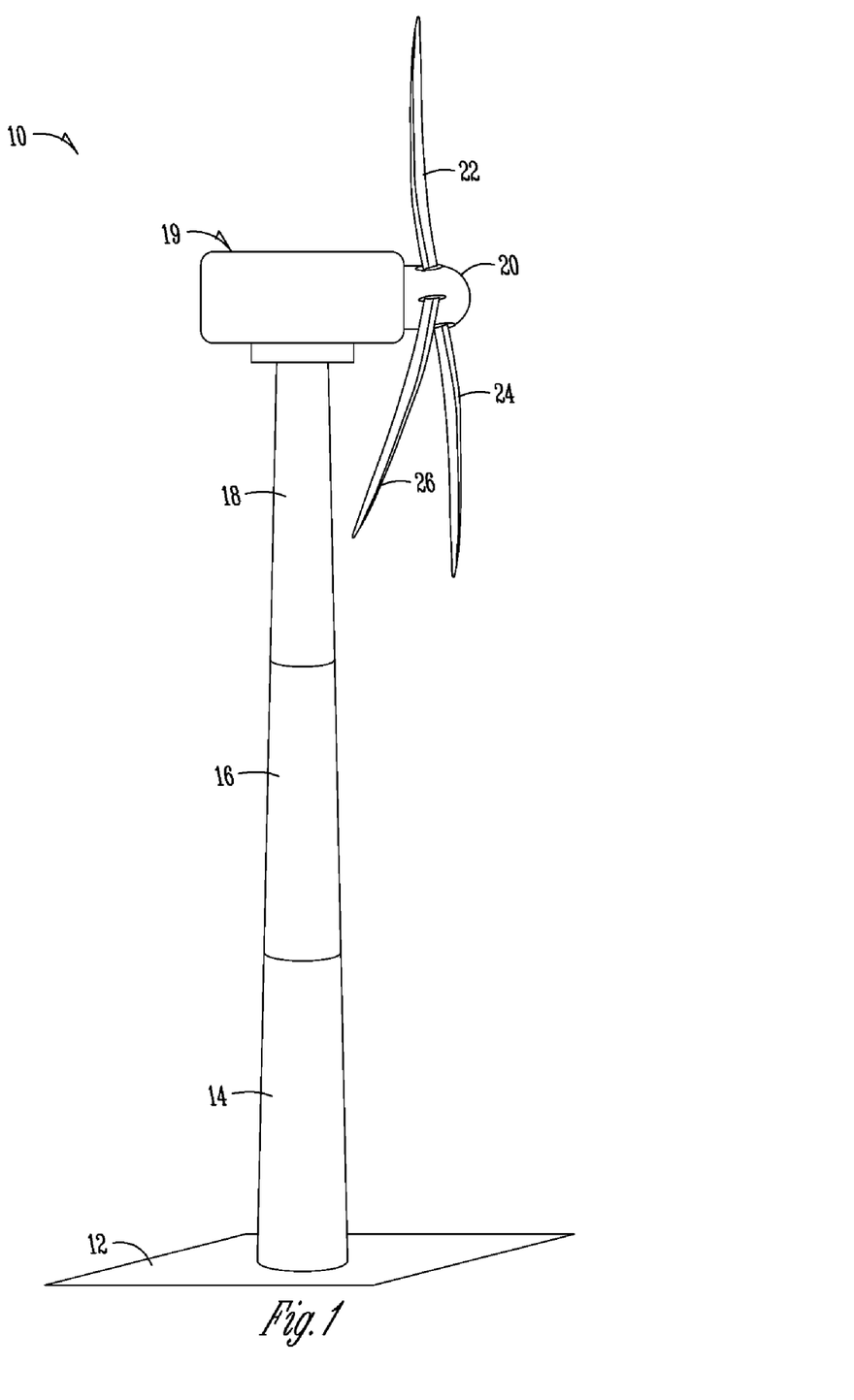
FIG. 1 is a perspective view of a typical wind turbine to show its basic parts.

Referring to the drawings, the numeral 10 refers to a wind turbine generally shown in FIG. 1. A wind turbine is typically bolted to a foundation 12 and is comprised of three sections—a base tower section 14, an intermediate tower section 16 and a top tower section 18. Attached to the top of top tower section 18 is a housing 19 wherein a generator is located. Attached to the housing 19 is hub 20 with rotor blades 22, 24 and 26 attached accordingly. These are the conventional components of a wind turbine 10.

The invention and the preferred embodiment here described relate to an erection system and method for setting a typical wind turbine 10 in place without having to use or rent large expensive for example 450 ton cranes. Normally a small crane, such as a 40 ton crane, may be necessary at the job site in order to lift and install the stacker unit and the bridge crane (both hereinafter described). As well the normal small crane can be used to move wind turbine parts (housing 19, hub 20, and blades 22, 24, 26) at the site.

Figure 2:
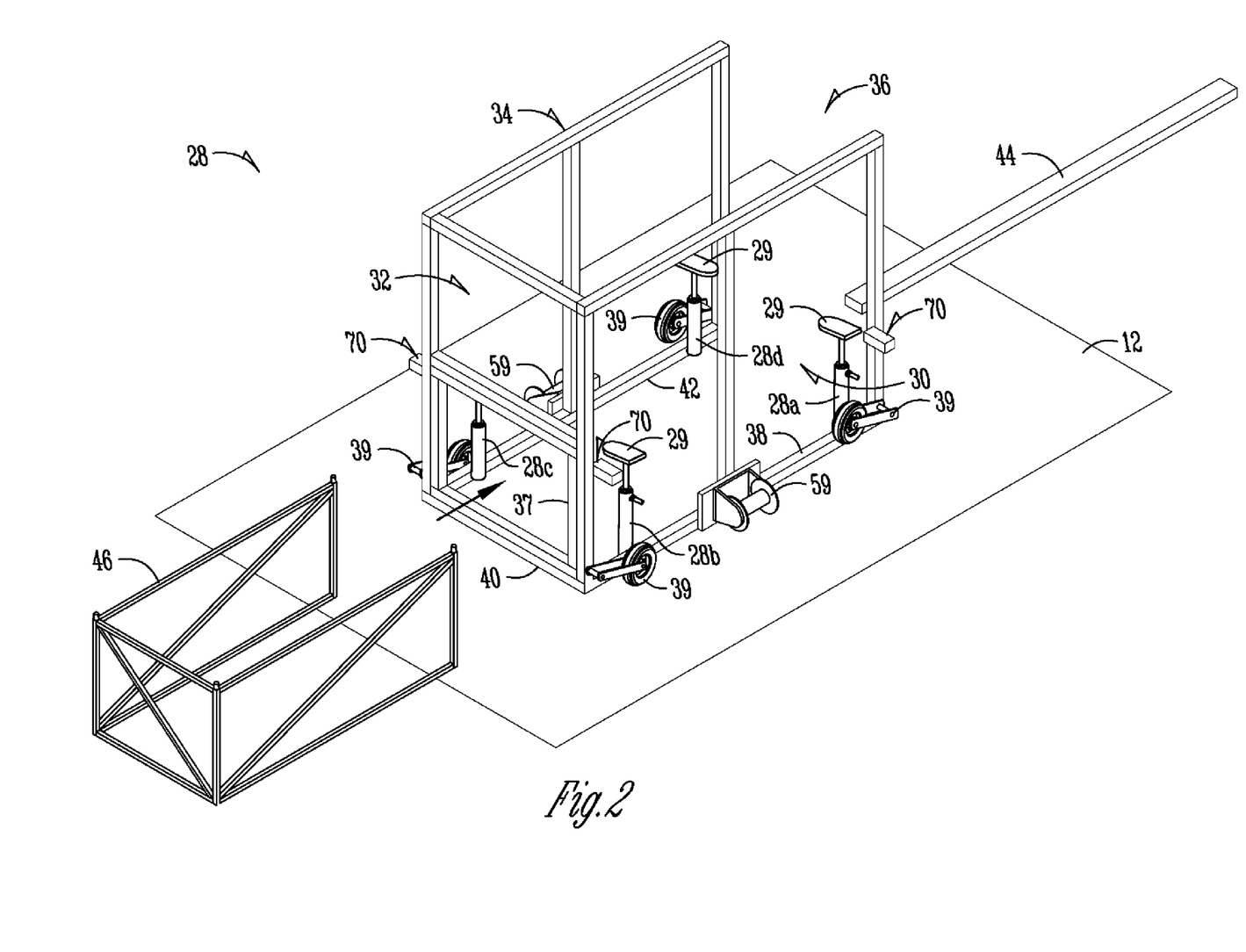
FIG. 2 is a perspective view of the base stacker unit, as set upon a foundation. The view further illustrates the hydraulic rams and pin drivers.
Figure 3:
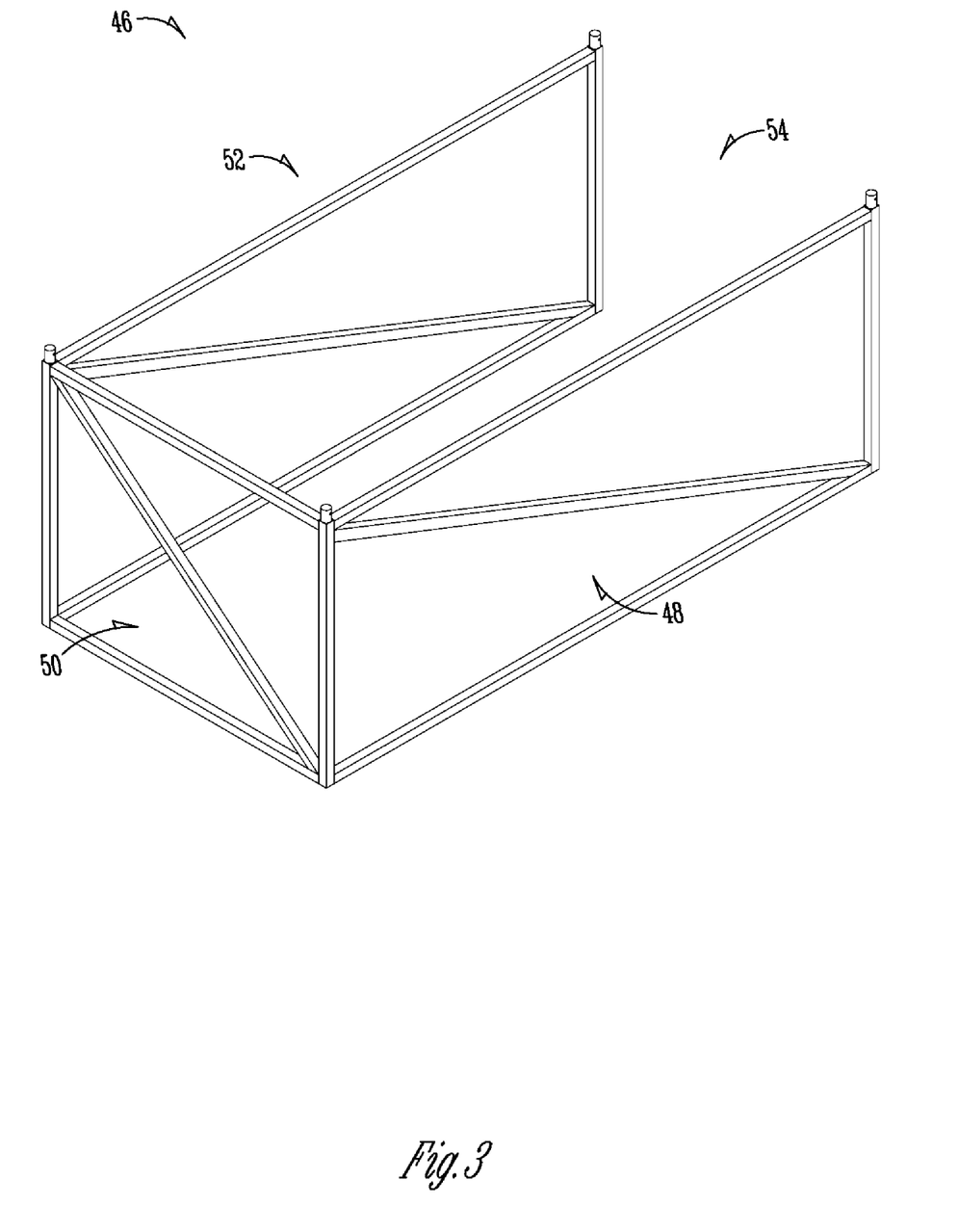
FIG. 3 is a perspective view of one of the intermediate modules, used to raise the erector system
Figure 4:
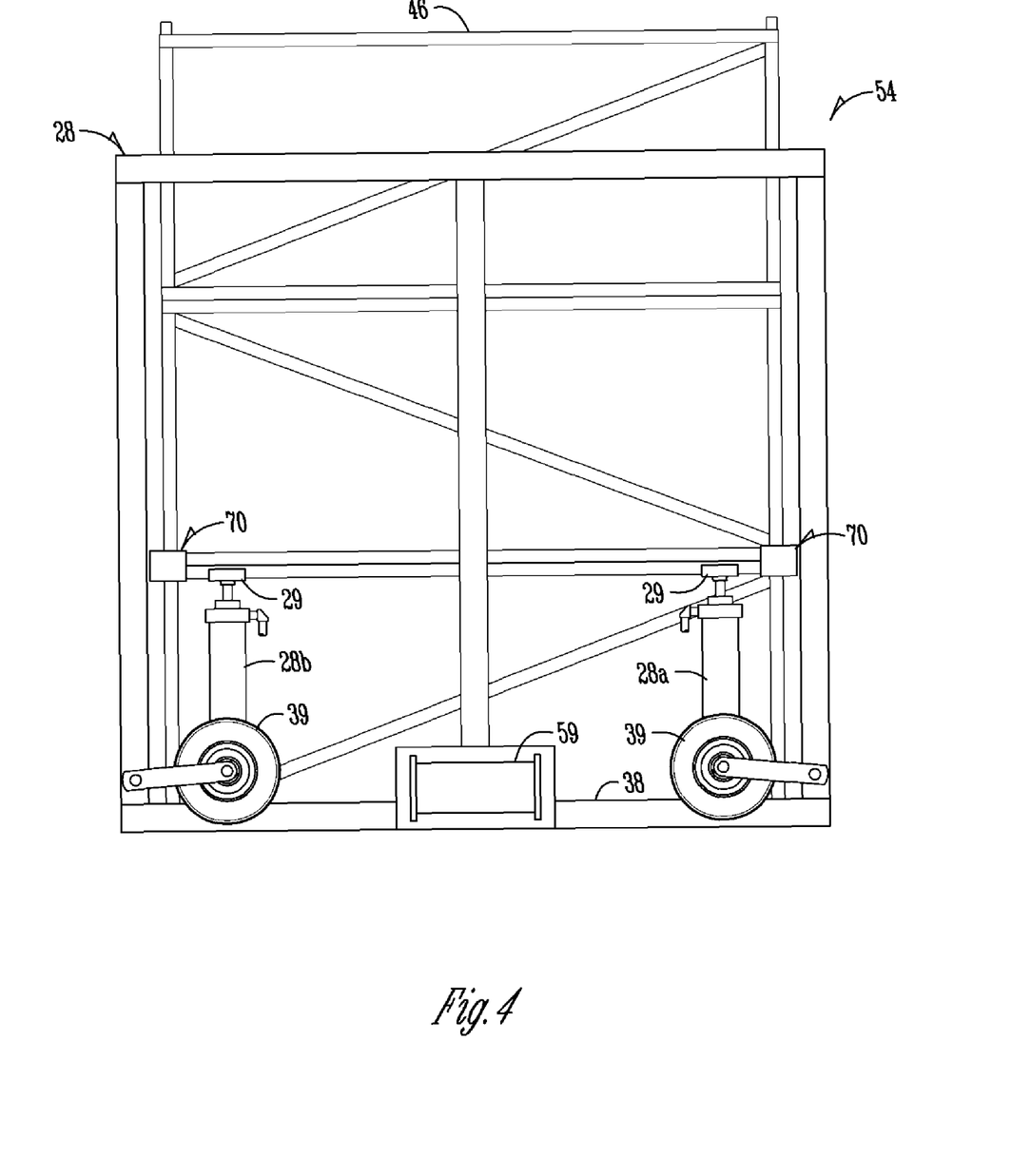
FIG. 4 is a side view of the base stacker unit with a stackable intermediate module.

This invention will be described hereafter assuming that the stacker unit 28 (FIG. 2) is mounted in place on foundation 12. Stacker unit 28 is an erected cage having cage sides 30, 32 and 34 and open side 36. It can be appreciated by one of ordinary skill in the art, though, that the stacker unit 28 could have cage sides comprising any number of geometries. For example, an octagonal design may better correspond to the shape and dimensions of the generally circular tower sections. Stacker unit 28 is bolted (not shown) in conventional fashion to foundation 12 of wind turbine 10 at the stacker feet 38, 40, and 42. Open side 36 faces monorail track 44. Stacker unit 28 is dimensioned so that a stackable intermediate module 46 will fit within it. (See FIG. 4).

Figure 5:
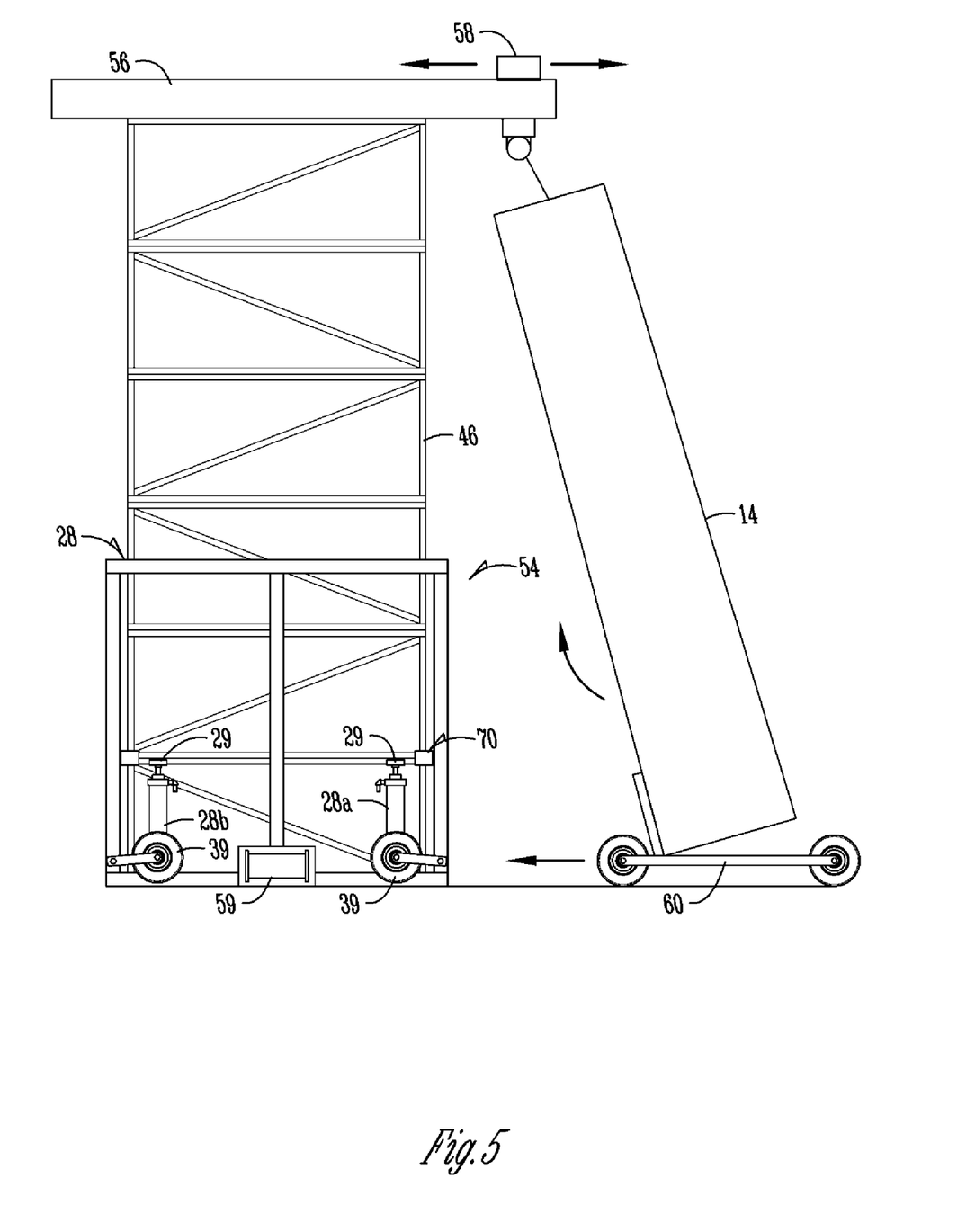
FIG. 5 shows a view similar to FIG. 4, but with the bridge crane mounted to the top of stacked intermediate modules, and as well shows the erecting sequence for the base tower section; it also shows the tower base dolly.
Figure 5A:
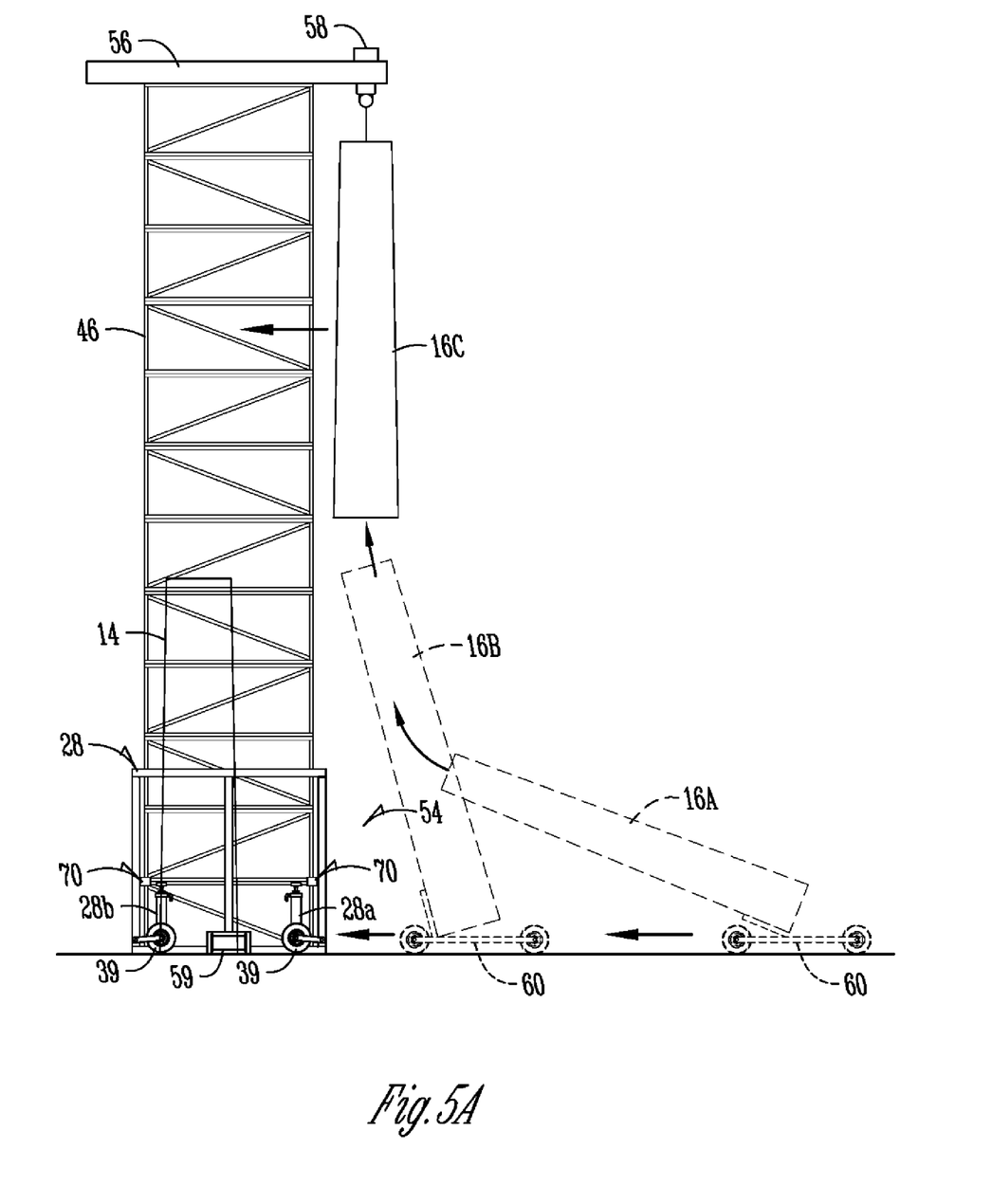
FIG. 5A shows the erecting sequence for the intermediate tower section.
Figure 5B:
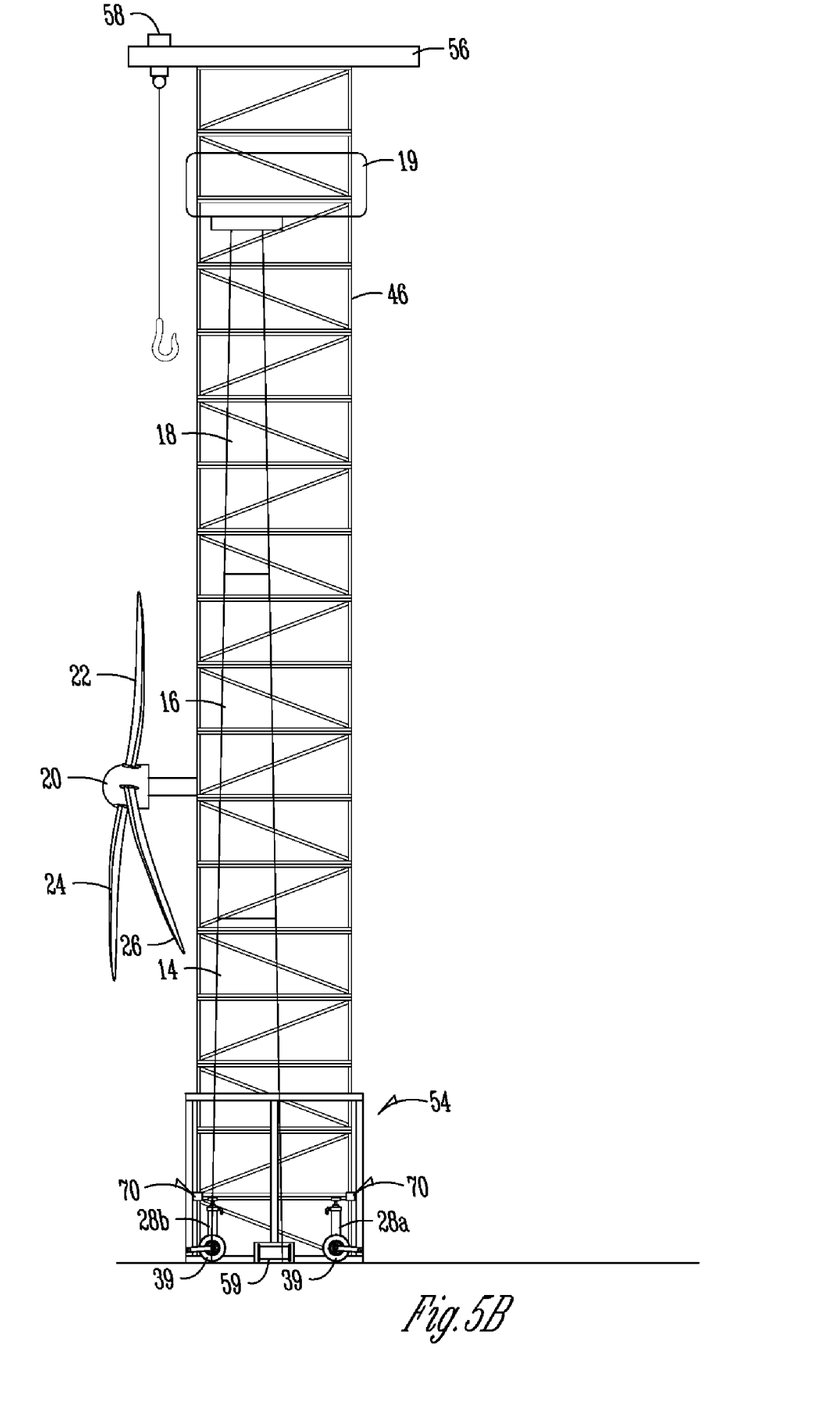
Figure 8:
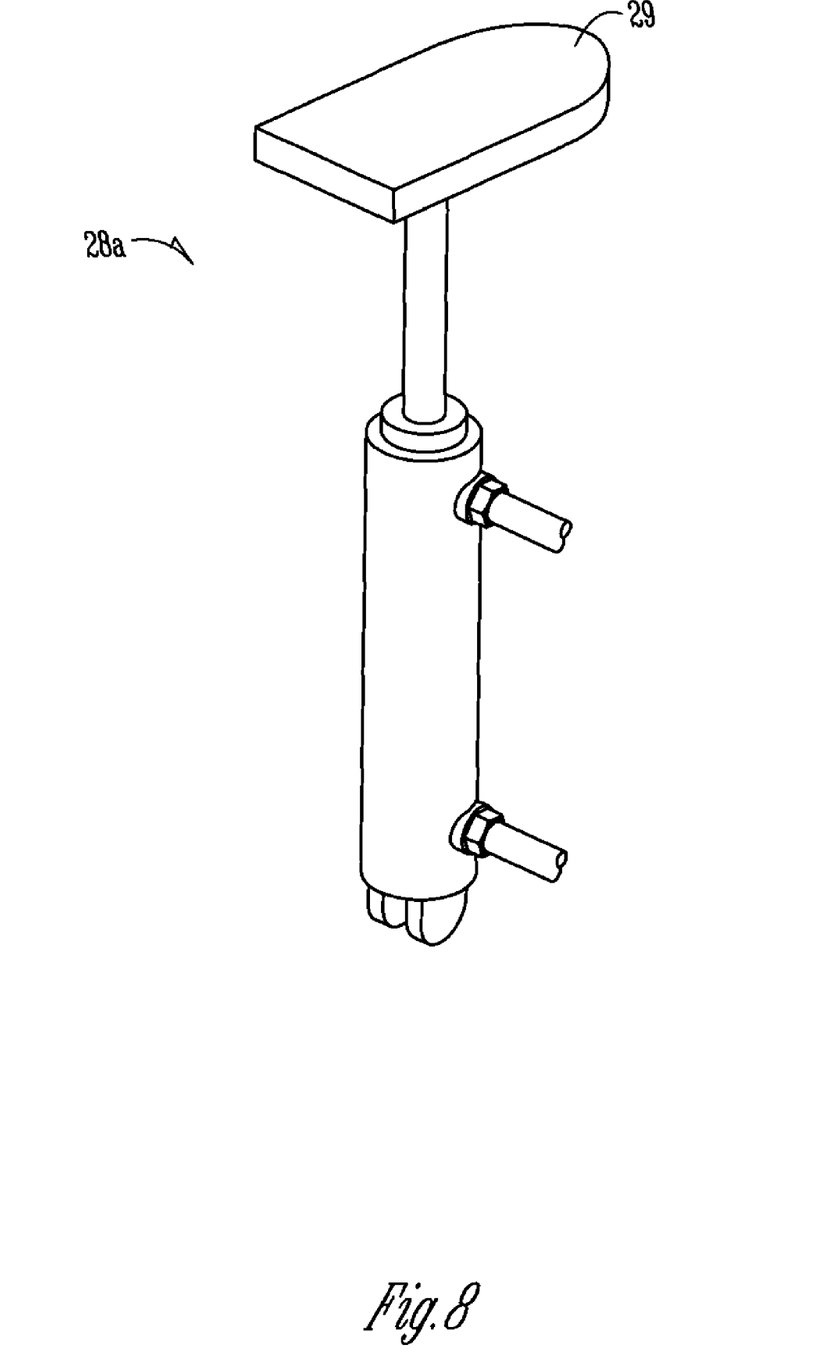
FIG. 8 shows a perspective view of a hydraulic lift ram.

At each corner of stacker unit 28 is mounted a mechanical actuator. In one embodiment, the mechanical actuators are hydraulic ram 28a, 28b, 28c and 28d (FIG. 8). It can be appreciated by a skilled artisan, however, that any mechanical actuator which provides a linear force could be used. The hydraulic rams have a lifting surface 29 for engagement with each intermediate module 46. Intermediate modules 46 similarly have three cage sides 48, 50, 52 and an open side 54. Intermediate modules 46 are of corresponding construction and dimensions to the receptacle 37 of the stacker unit 28 so that each may be inserted at the bottom of the stack and lifted vertically and later pinned. They may be stacked one under the other using the hydraulic rams (FIG. 8) and pinned (see FIG. 6) to create an erected tower as shown in FIG. 5B. In the stacking process hereinafter described, all intermediate modules 46 are stacked and pinned with the open side 54 oriented in the same direction. For convenience, the open side will be referred to from time to time as the north side for orientation purposes.

After the stacker unit 28 (FIG. 2) is located and mounted to foundation 10, monorail track 44 is placed in position, oriented to face the open north side 36. Thereafter using the hydraulic rams later described, the intermediate modules 46 are stacked one upon the other from the bottom and fastened with the pin fastening mechanism (later described in connection with FIG. 6). The small 40 ton crane unit (not depicted) is used to attach lateral bridge crane 56 to the top of the third of the stacked intermediate units 46 as best depicted in FIG. 5. The bridge crane 56 has attached to it at least one bridge crane pulley 58. The bridge crane 56 in conventional fashion can raise materials vertically and move them longitudinally relative to the stacked intermediate modules 46.

Figure 5C:
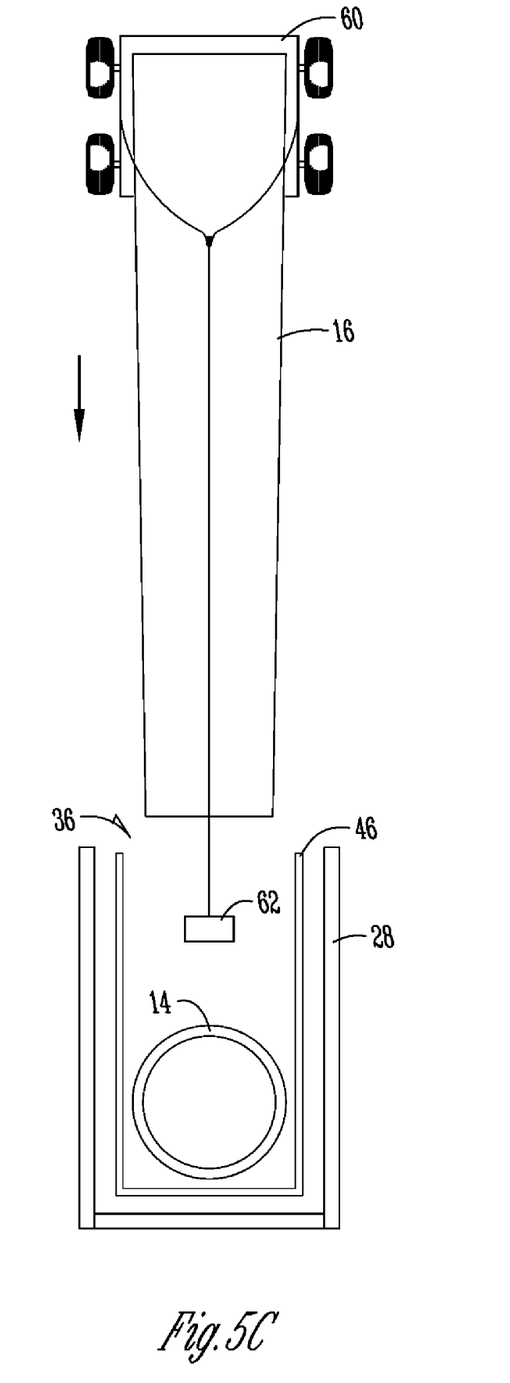
FIG. 5C shows a top view of the erecting sequence for the intermediate tower section.

Adjacent to the stacker unit 28 on the foundation 12 is tower base dolly 60 and ground winch 62 (see FIG. 5C). Base tower section 14 is positioned on tower base dolly 60 which rides on the earlier described monorail track 44. The ground winch 62 is used to pull tower base tower section 14 towards the open sides 54 of the stacked intermediate modules 46. As it gets close to the stacker unit 28 it is roughly vertically positioned beneath the bridge crane pulley 58. A lifting cable extending from bridge crane pulley 58 is attached to base tower section 14 to allow the section to be lifted into place. In one embodiment of this invention, the vertical lifting power of the lifting cable extending from bridge crane pulley 58 is provided by a plurality of stacker unit winches 59. However, one of ordinary skill in the art can appreciate that the bridge crane pulley 58 may be replaced with a winch sufficient to provide all of the vertical lifting power necessary for the wind tower sections, housing 19, hub 20, and rotor blades 22, 24, 26. As the base tower section 14 is lifted vertically, the tower base dolly 60 is correspondingly being pulled horizontally by ground winch 62. This process is illustrated by the dashed line intermediate positions during erection (shown in FIG. 5, 16A, 16B, and 16C). The bridge crane facilitates fastening of the tower sections together by allowing for lateral play in the movement of the bridge crane pulley 58. In this manner, the bridge crane pulley 58 provides sufficient play to allow the tower sections to be bolted together using conventional means.

Base tower section 14 is then located in a fully vertical position inside of the open side 54 as illustrated in FIG. 5C and anchored into position on foundation 12 via conventional means. Thereafter, the hydraulic rams (FIG. 8) of the stacker unit 28 are extended to push against the bottom side of already stacked modules and raise them to allow for the lateral sliding of additional intermediate modules 46 underneath the now raised intermediate modules 46. After each additional module is slid into place, the hydraulic rams are retracted to lower stacked intermediate modules and allow the additional module to be pinned to an already stacked module. The process is repeated until the intermediate tower section 16, top tower section 18, and housing 19 are erected. The current invention also contemplates the use of rollers or bumpers to in aid the alignment of intermediate and top tower sections 16, 18. For example, as the intermediate tower section 16 is raised for mounting on base tower section 14, a set of rollers or bumpers is connected across the open side 54 of stacked intermediate modules 46. In this manner, the rollers or bumpers will maintain the vertical alignment of the intermediate tower section 16 and prevent tower sections from swinging into already erected sections while erecting during windy conditions. After the top tower section 18 has been mounted, the housing 19 and hub 20 are raised as illustrated in FIG. 5. In one method of operation, the rotor blades 22, 24 and 26 are first attached to the hub 20 which is then attached to the housing 19. After all components are raised, the stack of intermediate modules 46 can be dismantled by reversing the process. The wind tower erection device is then moved to the next wind turbine erection site, and the process repeated.

Figure 6:
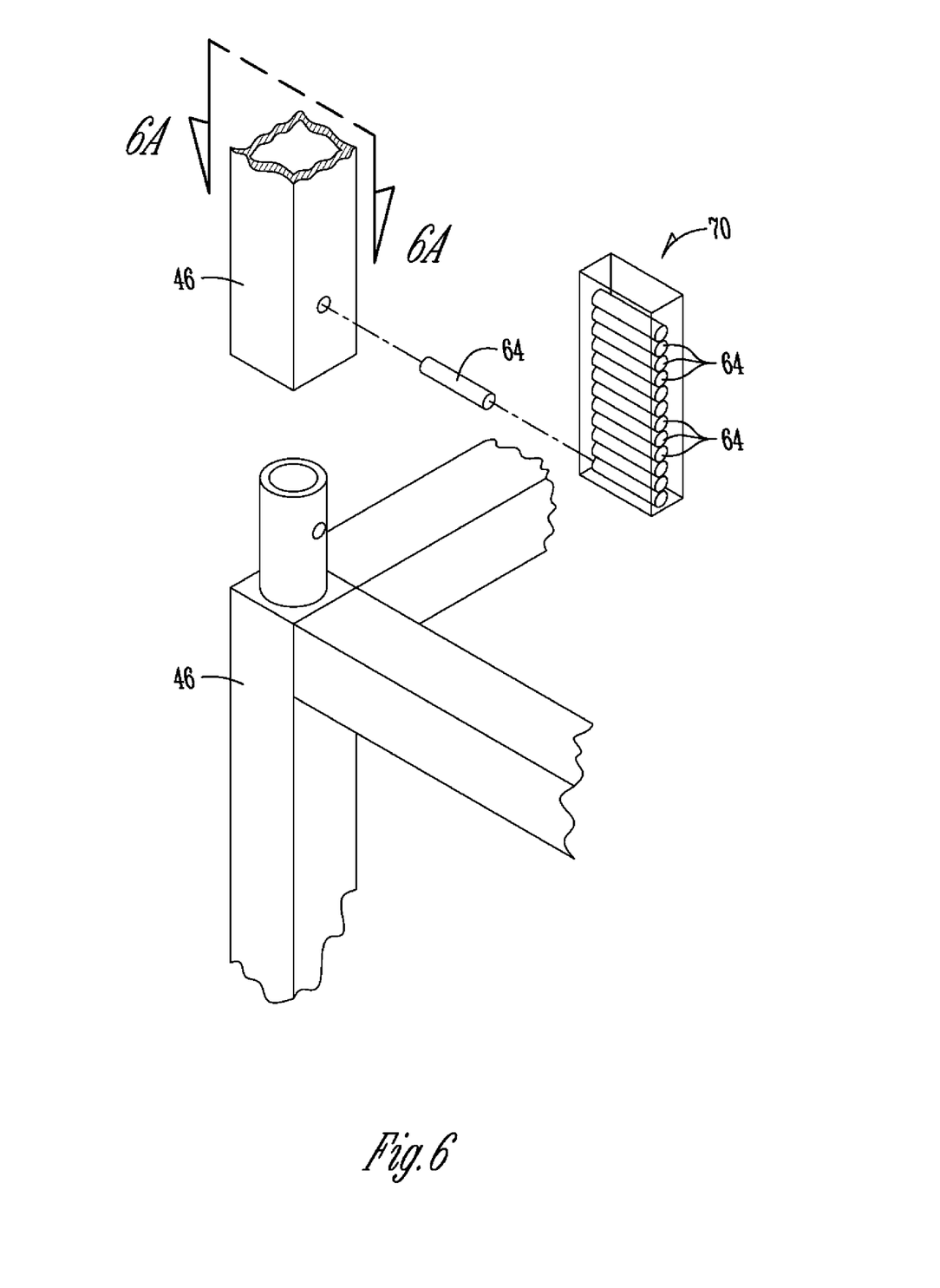
FIG. 6 shows the stackable intermediate module of FIG. 2, with the details of how the modules are pinned together and the associated pin magazine.
Figure 6A:
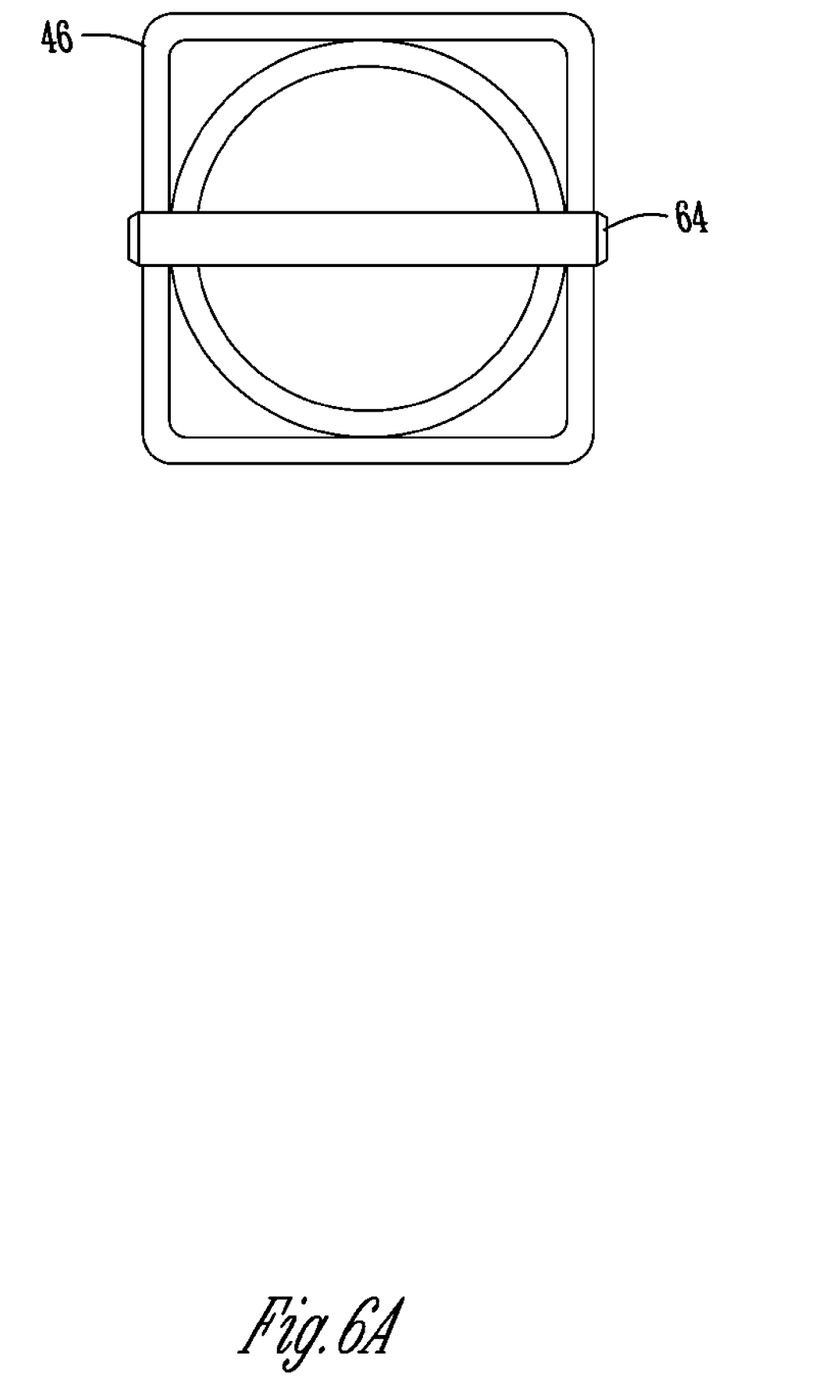
FIG. 6A shows a sectional view taken along line 6A-6A of FIG. 6 and illustrates how the intermediate modules are pinned together.

FIGS. 6 and 6A show the pin 64 and the corresponding aperture 66 used for locking the intermediate modules 46 in a stacking position. The pins 64 can be moved and removed as needed in stacking and unstacking. The pin magazine 68 holds a plurality of pins 64 proximate to the pin driver 70. The pin driver 70 can be any mechanical actuator that delivers a linear force. For example, a pneumatic bolt action driver or hydraulic bolt action driver is contemplated by the present invention to deliver a pin 64 into the aperture 66 of an intermediate module 46. When reversing the process to unstack the intermediate modules, the stroke of the pin driver 70 can be lengthened to push the pins 64 into a catch pan for reuse in the pin magazine 68.

Obviously as tower sections are raised and fastened together, there is an increased load bearing weight capacity. The increased capacity is utilized to increase the stability of the erection system during erection. The current invention contemplates a mechanism for securing stacked intermediate modules to the anchored base tower section and subsequent tower sections. In one embodiment, a tower clasping system hydraulically puts even pressure on the wind tower to accumulate strength from the towers permanent fixation to the foundation. The tower clasping system operates similar to 4 sets of brake pads. In this manner, the erection system would gain strength and stability as each tower section is put in place.

Figure 7:
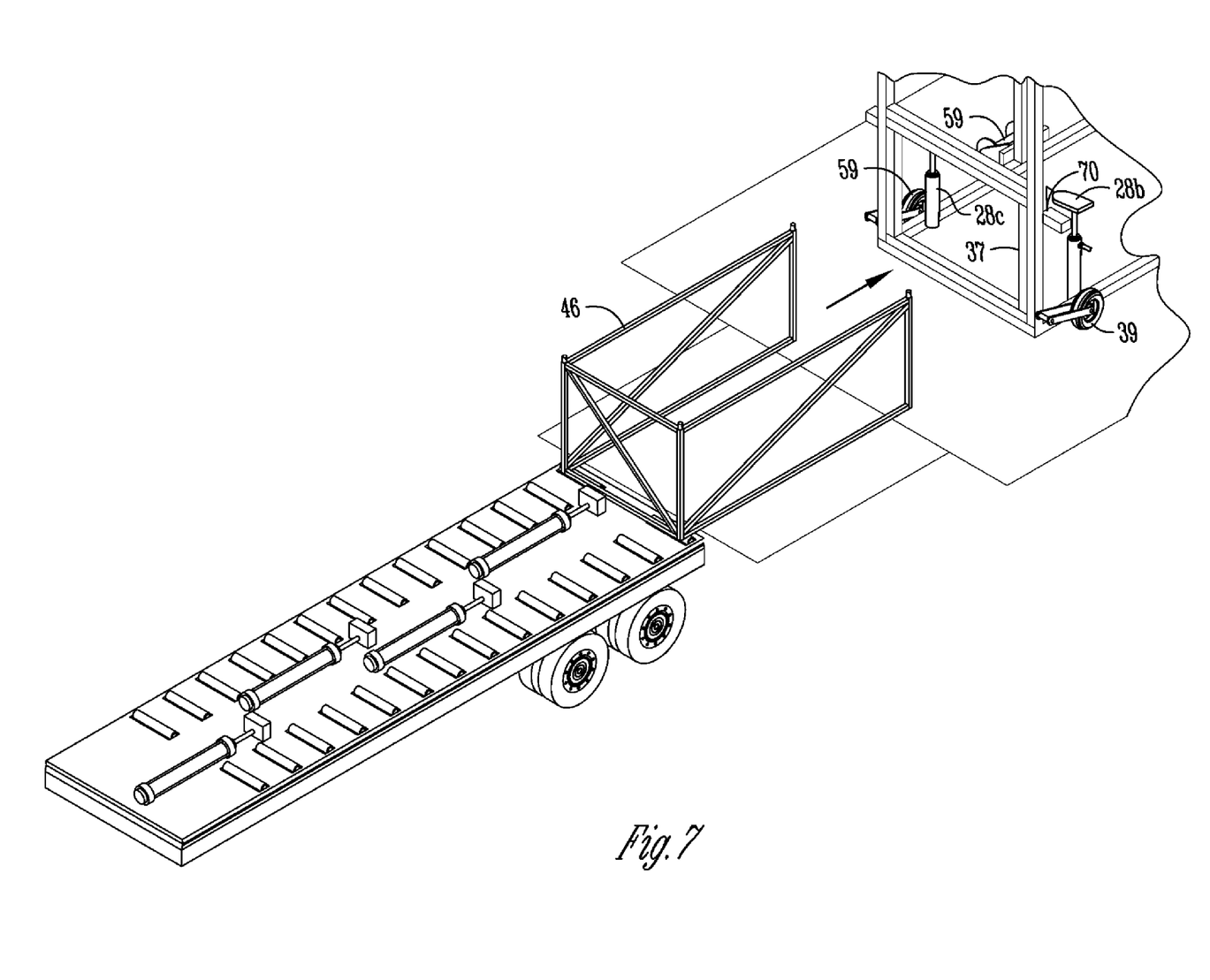
FIG. 7 shows a perspective view of the trailer for transporting of the various erector sections.

FIG. 7 shows a perspective view of the trailer for transporting the various erection components from wind turbine site to wind turbine site. It forms an important part of the overall invention as it allows a specialized trailer to conveniently and with a high degree of mobility take the stacker unit 28, intermediate modules 46, bridge crane section 56, dolly 60, and monorail system 44 to the next site. In another embodiment, the stacker unit 28 can be mobilized through the use of tires 39 mounted to the frame of the stacker unit 28. Hydraulic rams lower the tires to lift the stacker unit 28, two intermediate modules 46, and the bridge crane 56 off the ground. In this manner, the stacker unit travels as an assembly and can be pulled by heavy a duty truck.

FIG. 8 shows the hydraulic rams which are used to raise stacked modules. In particular, the hydraulic rams (FIG. 8) are extended to push against the bottom side of stacked modules and raise them. Once the stacked modules are raised an additional, or new, intermediate module is slid into the stacker unit 28 through a receptacle 37. After each additional module is slid into place, the hydraulic rams are retracted to lower stacked intermediate modules and allow the additional module to be pinned to a preceding—i.e., already stacked—module. Again it can be appreciated by a skilled artisan that the hydraulic rams need not be limited to conventional hydraulic rams but rather can be any mechanical actuator that is used to give a linear force.

The present invention further contemplates a mechanism for flipping a lifting surface 29 of the hydraulic rams such that the hydraulic ram may engage and disengage the intermediate modules. For example, the hydraulic rams may be fitted with a cam such that as the hydraulic ram retracts, the lifting surface 29 is flipped from an engagement position to disengagement position. This process is repeated when the hydraulic ram extends so that the surface is flipped from a disengagement position to an engagement position. In this manner, the hydraulic rams can lower the raised stack of intermediate modules onto the new intermediate module slid in through the receptacle, disengage to allow the new intermediate module to be pinned to a preceding intermediate module, and reengage the new intermediate module for vertical lifting to allow the process to repeat.

According to one aspect of the present invention, a method for erecting a wind turbine 10, having a base tower section 14, an intermediate tower section 16, a top tower section 18 to which a housing 19, hub 20, and turbine blade 22 can be attached is provided. The method including the steps of: placing a stacker unit 28 on a wind turbine foundation 12; the stacker unit 28 having a receptacle 37 for lateral sliding of vertically stackable intermediate modules 46 into said stacker unit 28; stacking a plurality of vertically stackable intermediate modules 46, each under the other until a sufficient height is achieved to raise a tower section; placing a crane section 56 on top of the stacked intermediate modules 46; raising a wind turbine tower section within the intermediate modules 46; and repeating the stacking and raising steps until the wind turbine tower sections are raised and erected.

According to another aspect of the present invention, a process of erecting a wind turbine 10, having a base tower section 14, an intermediate tower section 16, a top tower section 18, and housing 19 to which a hub 20 and turbine blade 22 can be attached to is provided. The process comprising the steps of: placing a stacker unit 28 on a wind turbine foundation 12; stacking a plurality of vertically stackable intermediate modules 46; placing a crane section 56 on top of the stacked intermediate modules 46; placing the hub 19 within the plurality of stacked intermediate modules 46; repeating the stacking of intermediate modules 46 each under the other until a sufficient height is achieved to raise a wind tower base section 14; raising a wind tower base section 14 within the intermediate modules 46; repeating the stacking and raising steps until the wind tower intermediate 16 and top tower sections 18 are raised and erected; raising a housing 20; securing the rotor blades 22, 24, 26 to the hub 19; raising the hub 19 with rotor blades 22, 24, 26; unstacking the plurality of stacked intermediate modules 46; removing the crane section 56 from the top of the stacked intermediate modules 46; and hauling the stacking unit 28, crane section 56, and intermediate modules 46 to the next wind turbine foundation. The process having the advantage of eliminating the need of using a plurality of cranes. In particular, the present invention does not require the use of any crane outside of the crane used to attach the bridge crane to the top of the intermediate modules.

The attachment of the hub to the housing represents a significant problem in the art. Specifically, when the blades are attached to the hub the assembly becomes unwieldy. Furthermore, a 450 ton crane is required to lift the assembly to the required height. The present invention contemplates a method for raising a hub and attaching it to a housing. According to one aspect of the present invention, a method of attaching a hub 19 with rotor blades 22, 24, 26 to the housing 20 of a wind turbine 10 is provided. The wind turbine having a base tower section 14, an intermediate tower section 16, a top tower section 18, and a housing 20. The method includes the steps of: stacking a plurality of vertically stackable intermediate modules 46; placing a hub within the plurality of stacked intermediate modules 46; continuing the stacking of intermediate modules 46 until a sufficient height is achieved such that the turbine blades 22, 24, 26 may be fastened to the hub 19; raising the hub 19 with turbine blades 22, 24, 26 to a level commensurate with the housing 20 of the wind turbine 10; and securing the hub 19 with turbine blades 22, 24, 26 to the housing 20. The method having the advantage of eliminating the need of using a plurality of cranes. The bridge crane 56 and bridge crane pulley 58 is used to place the hub 19 within the plurality of stacked intermediate modules 46 and raise the turbine blades to a height commensurate the hub 19 for attachment to the hub 19. Finally, it can be appreciated by a skilled artisan that guide rails may be used to steady the hub/blade assembly during windy conditions for bolting to the housing 19.

As can be seen from the description, large expensive 450 ton cranes are avoided, thus cost savings occur; it is estimated that a time savings in wind turbine erection will be as much as 20-25%. It therefore can be seen that the invention accomplishes at least all of its stated objectives.

What is claimed is:

1. A wind turbine erection device for erecting a wind turbine on top of a wind turbine foundation, comprising:
 a plurality of vertically stackable intermediate modules each of which have three closed perimeter sides and one open side to allow said closed sides to surround within said three closed perimeter sides, wind turbine tower sections;
 a fixed size stacker unit anchored to said foundation, the stacker unit having a receptacle for lateral sliding of intermediate modules inside of the stacker unit and a hydraulically powered mechanical actuator for raising intermediate modules vertically stacked upon each other so additional modules can be inserted under the previously stacked ones; and
 a bridge crane section to be attached to the top of a plurality of stacked intermediate modules, the bridge crane allowing a plurality of said tower sections, a housing, a hub, and a plurality of rotor blades to be hoisted vertically, the bridge and the intermediate modules structured for vertically raising the housing and the hub through the intermediate modules.

2. The wind turbine erection device of claim 1 wherein the stacker unit has at least one open side.

3. The wind turbine erection device of claim 2 which has an associated monorail and dolly for moving tower sections laterally into place for vertical rising.

4. The wind turbine erection device of claim 3 wherein the stacker unit defines four corners and at each corner is a hydraulic mechanical actuator.

5. The wind turbine erection device of claim 1 wherein the mechanical actuator is a hydraulic ram fitted with a mechanism to pivot the lifting surface of the hydraulic ram between engagement and disengagement positions.

6. The wind turbine erection device of claim 5 further having a plurality of winches associated with the bridge crane section to raise tower sections.

7. The wind turbine erection device of claim 6, wherein the stacker unit includes a receptacle to accommodate lateral sliding of intermediate modules inside of the stacker unit.

8. The wind turbine erection device of claim 7 wherein the stacker unit is mobile.

9. The wind turbine erection device of claim 8 wherein the stacker unit has associated pin drivers to releasably pin the intermediate modules to each other.

10. The wind turbine erection device of claim 9 wherein the pin drivers are pneumatic bolt action drivers.

11. The wind turbine erection device of claim 10 wherein the pin drivers are hydraulic bolt action drivers.

12. The wind turbine erection device of claim 9 wherein the intermediate modules are of corresponding dimensions with the receptacle of the stacker unit.

13. The wind turbine erection device of claim 12 wherein a mechanism secures stacked intermediate modules to erected tower sections.

14. The wind turbine erection device of claim 13 wherein rollers are connected across the open side of stacked intermediate modules to maintain the vertical alignment of the intermediate tower section and top tower section during erection.

15. A method of erecting a wind turbine, having a base tower section, an intermediate tower section, a top tower section to which a housing, hub, and rotor blades can be attached, comprising:
 anchoring a fixed size stacker unit on a wind turbine foundation;
 said stacker unit having a receptacle for lateral sliding of vertically stackable intermediate modules each having at least one open side into said stacker unit;
 stacking a plurality of vertically stackable intermediate modules, each under the other until a sufficient height is achieved to raise a wind tower section;
 placing a crane section on top of the stacked intermediate modules;
 raising a wind tower section within the intermediate modules;
 repeating the stacking and raising steps until the wind tower sections are raised and erected; and
 vertically raising the housing and the hub through the stacked intermediate modules.

16. The method of claim 15 further comprising the step of moving tower sections laterally into place for vertical rising on an associated monorail and dolly.

17. The method of claim 16 further comprising the step of raising the intermediate modules through a mechanical actuator.

18. The method of claim 17 further comprising the step of raising the intermediate modules through a hydraulic ram.

19. The method of claim 18 further comprising the step of raising tower sections using a plurality of winches associated with the bridge crane section.

20. The method of claim 19, further comprising the step of sliding intermediate modules inside of the stacker unit through a receptacle.

21. The method of claim 20 further comprising the step of releasably pinning intermediate modules to each other.

22. The method of claim 21 further comprising the step of pinning intermediate modules using an associated pin driver.

23. The method of claim 22 further comprising the step of aligning the intermediate modules commensurate with the receptacle of the stacker unit.

24. A process of erecting a wind turbine, having a base tower section, an intermediate tower section, a top tower section, and housing to which a hub and turbine blade can be attached to, comprising:
 anchoring a fixed size stacker unit on a wind turbine foundation;
 stacking a plurality of vertically stackable intermediate modules;
 placing a crane section on top of the stacked intermediate modules;
 placing the hub within the plurality of stacked intermediate modules;
 repeating the stacking of intermediate modules each under the other until a sufficient height is achieved to raise a wind tower base section, said modules each stacked upon each other;
 raising a wind tower base section within the intermediate modules;
 repeating the stacking and raising steps until the wind tower intermediate and top tower sections are raised and erected;
 raising a housing;
 securing the rotor blades to the hub;
 raising the hub with rotor blades;
 unstacking the plurality of stacked intermediate modules;
 removing the crane section from the top of the stacked intermediate modules; and
 hauling the stacking unit, crane section, and intermediate modules to the next wind turbine foundation.

25. A method of attaching a hub with rotor blades to a wind turbine, having a bottom tower section, an intermediate tower section, a top tower section, and a housing, comprising:

stacking a plurality of vertically stackable intermediate modules;

placing a hub within the plurality of stacked intermediate modules;

repeating the stacking of vertically stackable intermediate modules each under the other stacked upon each other until a sufficient height is achieved to raise a wind tower base section;

raising a wind tower base section within the intermediate modules;

repeating the stacking and raising steps until the wind tower intermediate and top sections are raised and erected;

fastening the rotor blades to the hub;

raising the hub with rotor blades to a level commensurate with the housing of the wind tower: and securing the hub with rotor blades to the housing.

* * * * *